(12) United States Patent
Savela et al.

(10) Patent No.: US 9,506,507 B2
(45) Date of Patent: Nov. 29, 2016

(54) MULTI-SPEED VISCOUS CLUTCH

(71) Applicant: Horton, Inc., Roseville, MN (US)

(72) Inventors: Derek Savela, St. Paul, MN (US); Scott Miller, Minneapolis, MN (US)

(73) Assignee: Horton, Inc., Roseville, MN (US)

( * ) Notice: Subject to any disclaimer, the term of this patent is extended or adjusted under 35 U.S.C. 154(b) by 0 days.

(21) Appl. No.: 14/772,680

(22) PCT Filed: Feb. 12, 2014

(86) PCT No.: PCT/US2014/015985
§ 371 (c)(1),
(2) Date: Sep. 3, 2015

(87) PCT Pub. No.: WO2014/158397
PCT Pub. Date: Oct. 2, 2014

(65) Prior Publication Data
US 2016/0003310 A1    Jan. 7, 2016

Related U.S. Application Data

(60) Provisional application No. 61/782,229, filed on Mar. 14, 2013.

(51) Int. Cl.
*F16D 35/02* (2006.01)
*F16D 33/10* (2006.01)

(52) U.S. Cl.
CPC ........... *F16D 35/021* (2013.01); *F16D 35/024* (2013.01); *F16D 33/10* (2013.01); *F16D 35/02* (2013.01); *F16D 35/027* (2013.01);
(Continued)

(58) Field of Classification Search
None
See application file for complete search history.

(56) References Cited

U.S. PATENT DOCUMENTS 2,629,472 A    2/1953    Sterner
2,792,095 A    5/1957    Sherman
(Continued)

FOREIGN PATENT DOCUMENTS

CN    1497198 A    5/2004
CN    101400916 A    4/2009
(Continued)

OTHER PUBLICATIONS

Office Action from the Korean Patent Office for Application Serial No. 10-2015-7025994, Dated Oct. 29, 2015, 6 pages.
(Continued)

*Primary Examiner* — Colby M Hansen
(74) *Attorney, Agent, or Firm* — Kinney & Lange, P.A.

(57) ABSTRACT

A viscous clutch includes a rotor, a housing member, a working chamber located between the housing member and the rotor, a reservoir to hold viscous fluid that is configured to rotate with the rotor, a return bore in fluid communication between the working chamber and the reservoir, a first passage from the reservoir to the working chamber, a second passage from the reservoir to the working chamber, and a valve. The second passage is spaced from the first passage, and can extend substantially radially through the rotor. The valve is configured to selectively regulate flow of the viscous fluid through the first passage, and the second passage is unobstructed such that the viscous fluid can pass from the reservoir to the working chamber regardless of the operational state of the valve. Viscous fluid present in the working chamber rotationally couples the rotor and the housing member.

16 Claims, 3 Drawing Sheets

(52) U.S. Cl.
CPC ........... *F16D35/028* (2013.01); *F16D 35/029* (2013.01); *F16D 2500/10468* (2013.01)

(56) References Cited

U.S. PATENT DOCUMENTS

| | | |
|---|---|---|
| 3,215,235 A | 11/1965 | Kamm |
| 3,444,748 A | 5/1969 | Sutaruk |
| 3,584,716 A | 6/1971 | Coty |
| 3,741,359 A | 6/1973 | Leichliter |
| 3,757,914 A | 9/1973 | Elmer |
| 3,841,451 A | 10/1974 | Saylor et al. |
| 4,046,239 A | 9/1977 | Tinholt |
| 4,064,980 A | 12/1977 | Tinholt |
| 4,246,995 A | 1/1981 | Gee |
| 4,467,747 A | 8/1984 | Braatz et al. |
| 4,667,792 A | 5/1987 | Hauser |
| 4,880,095 A | 11/1989 | Nakamura |
| 4,924,986 A | 5/1990 | Elmer |
| 5,099,803 A | 3/1992 | Nakamura |
| 5,194,057 A | 3/1993 | Sommer |
| 5,195,623 A | 3/1993 | Sommer |
| 5,242,039 A | 9/1993 | Mabee |
| 5,782,715 A | 7/1998 | Walton et al. |
| 5,803,221 A | 9/1998 | Kawada et al. |
| 5,957,259 A | 9/1999 | Teramae |
| 6,026,943 A | 2/2000 | Fuchs et al. |
| 6,056,098 A | 5/2000 | Brown et al. |
| 6,752,251 B2 | 6/2004 | May et al. |
| 6,814,033 B2 | 11/2004 | Ito et al. |
| 7,047,911 B2 | 5/2006 | Robb et al. |
| 7,159,702 B2 | 1/2007 | Tilly |
| 7,293,636 B2 | 11/2007 | May |
| 7,318,510 B2 | 1/2008 | Heinle et al. |
| 7,828,529 B2 | 11/2010 | Baumgartner et al. |
| 7,914,264 B2 | 3/2011 | Baumgartner et al. |
| 2001/0027903 A1 | 10/2001 | Lutz |
| 2007/0215431 A1 | 9/2007 | Pickelman, Jr. et al. |
| 2009/0084650 A1* | 4/2009 | Hennessy ............. F16D 35/024 192/58.61 |
| 2011/0209962 A1 | 9/2011 | Hennessy et al. |
| 2012/0164002 A1 | 6/2012 | Roczniak et al. |
| 2012/0279820 A1 | 11/2012 | Hennessy et al. |

FOREIGN PATENT DOCUMENTS

| | | |
|---|---|---|
| DE | 19741073 A1 | 3/1999 |
| DE | 19821097 A1 | 11/1999 |
| DE | 19842343 A1 | 3/2000 |
| DE | 19849487 A1 | 5/2000 |
| DE | 102011050360 A1 | 11/2012 |
| DE | 102011076745 A1 | 12/2012 |
| EP | 1256738 A2 | 11/2002 |
| KR | 20080033484 A | 4/2008 |
| KR | 20120091375 A | 8/2012 |
| WO | WO 01/14747 A1 | 3/2001 |
| WO | WO 01/14759 A1 | 3/2001 |
| WO | WO 2009/140146 A2 | 11/2009 |
| WO | WO 2010/070414 A2 | 6/2010 |
| WO | WO 2012/024497 A2 | 2/2012 |
| WO | WO 2011/062856 A2 | 5/2012 |
| WO | WO 2012/156264 A1 | 11/2012 |

OTHER PUBLICATIONS

International Search Report and Written Opinion from PCT Application Serial No. PCT/US02014/015985, dated May 21, 2014, 11 pages.

First Office Action from Chinese Patent Application No. 201480013787.3, Dated May 29, 2016, 8 pages.

* cited by examiner

MULTI-SPEED VISCOUS CLUTCH

BACKGROUND

The present invention relates generally to clutches, and more particularly to viscous clutches.

Viscous clutches are used in a wide variety of automotive fan drive applications, among other uses. These clutches typically employ relatively thick silicone oil (generally called shear fluid or viscous fluid) for the selective transmission of torque between two rotating components. It is possible to engage or disengage the clutch by selectively allowing the oil into and out of a working area of the clutch located between input and output members (e.g., between an input rotor and an output housing). A valve is used to control the flow of the oil in the working area between the input and the output. Recent clutch designs have been employed that allow the oil to be stored in the rotating input portion of the clutch while the clutch is disengaged, in order to keep kinetic energy available to the oil to allow rapid engagement of the clutch from the off condition. This also allows the clutch to have a very low output speed (e.g., fan speed) while the valve is positioned to obstruct oil flow into the working area. It has also become common for the clutch to be controlled electrically. This has been done to increase the controllability of the clutch, and to also have the clutch capable of responding to multiple cooling needs in a vehicle. Some of the possible cooling needs are coolant temperature, intake air temperature, air conditioning pressure, and oil temperature.

However, the electric control of a viscous clutch requires extensive effort to develop a desired control algorithm that governs clutch response to operational parameters. A separate control algorithm may be needed for every application, even where the basic clutch geometry remains the same.

Therefore, it is desired to provide an alternative viscous clutch.

SUMMARY

A viscous clutch includes a rotor, a housing member, a working chamber located between the housing member and the rotor, a reservoir to hold viscous fluid that is configured to rotate with the rotor, a return bore in fluid communication between the working chamber and the reservoir, a first passage from the reservoir to the working chamber, a second passage from the reservoir to the working chamber, and a valve. The second passage is spaced from the first passage, and can extend substantially radially through the rotor. The valve is configured to selectively regulate flow of the viscous fluid through the first passage, and the second passage is unobstructed such that the viscous fluid can pass from the reservoir to the working chamber regardless of the operational state of the valve. Viscous fluid present in the working chamber rotationally couples the rotor and the housing member.

Figure 1:
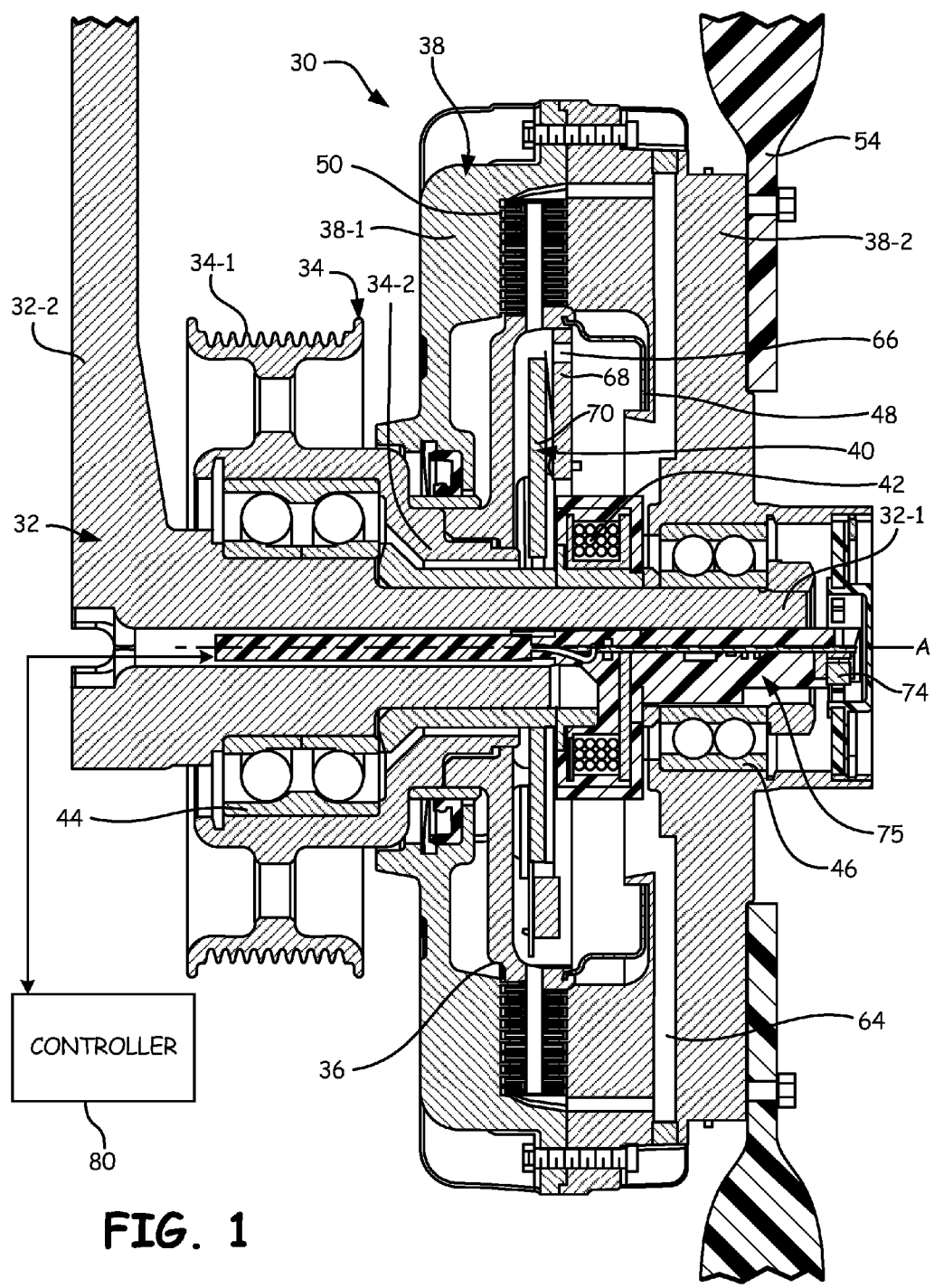
FIG. 1 is a cross section view of one embodiment of a clutch according to the present invention.

While the above-identified figures set forth embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present invention relates to a viscous clutch assembly, and an associated method of use, that is suitable for use as a fan clutch in automotive applications. In general, the clutch (or drive) can include a bypass bore (or passage) and a valve bore (or passage) that each extend between a reservoir and a working chamber. A viscous (or shear) fluid can be introduced to the working chamber to create a viscous shear coupling to transmit torque between an input and an output, such as to transmit torque from an engine to a cooling fan. A return bore can provide a return path for the viscous fluid, from the working chamber to the reservoir. The bypass bore can remain open and unobstructed during all operational conditions, such that the viscous fluid can continually pass through the bypass bore from the reservoir to the working chamber to maintain viscous engagement between the clutch input and output at (or above) a minimum threshold at all times. A valve can be positioned to selectively cover and uncover the valve bore, to selectively introduce additional viscous fluid to the working chamber to increase viscous engagement between the clutch input and output to a relative maximum. One benefit of the present invention is the ability to provide a relatively simple viscous clutch that allows for multi-speed operation without a need to provide application-specific control algorithms to match clutch output to operational parameters, such as cooling demand, engine speed, etc. This allows a single clutch configuration to be readily used in a variety of applications without a need for custom modification. Another benefit of the present invention is the ability to provide multi-speed clutch operation without the need for a pneumatic or hydraulic actuation system as commonly needed with (non-viscous) friction clutches.

FIG. 1 is a cross section view of one embodiment of a clutch 30, which includes a journal bracket (or mounting shaft) 32, a pulley 34, a rotor 36, a two-part housing 38, a valve assembly 40, an electromagnetic coil 42, a first bearing set 44, a second bearing set 46, a reservoir 48, a working chamber 50, and an output structure (e.g., fan) 54. The clutch 30 defines an axis of rotation A. A controller 80 can further be provided. The clutch 30 can resemble a clutch disclosed in commonly-assigned U.S. Patent Application Publication No. 2012/0279820, entitled "Integrated Viscous Clutch," which is hereby incorporated by reference in its entirety. However, it should be noted that the illustrated embodiment is shown merely by way of example and not limitation, and in further embodiments other clutch configurations are possible.

The journal bracket 32 can be a stationary (i.e., non-rotating) component that is secured to a mounting location, such as an engine block in a vehicle's engine compartment. It should be understood that while described as being "stationary" the journal bracket 32 can be installed within a moving vehicle, and the term "stationary" is used herein in relation to the mounting location. In the illustrated embodiment, the journal bracket 32 includes an axially extending shaft portion 32-1 and a generally radially extending flange portion 32-2. In alternative embodiments, the clutch 30 could be provided with a live shaft instead of the stationary journal bracket 32. The journal bracket 32 is structurally functional, and in some embodiments can also be magnetically functional.

The pulley (or sheave) 34 is rotatably supported on the shaft portion 32-1 of the journal bracket 32 in the illustrated embodiment, and is configured to accept rotational torque input from a belt (not shown). In the illustrated embodiment, the pulley 34 is positioned adjacent to the flange portion 32-2 of the journal bracket 32. Moreover, in the illustrated embodiment, the pulley 34 encircles the shaft portion 32-1 of the journal bracket 32 and is rotatably mounted on the shaft portion 32-1 by the first bearing set 44, which can be axially aligned with a belt engagement portion 34-1 of the pulley 34. A size (i.e., diameter) of the belt engagement portion 34-1 can be selected to help provide a desired rotational input speed to the clutch 30, as will be understood by persons of ordinary skill in the art. A lateral portion 34-2 of the pulley 34 extends generally axially forward from the belt engagement portion 34-1.

The rotor 36 is attached to the lateral portion 34-2 of the pulley 34, and thereby accepts a toque input to the clutch 30 whenever such input torque is provided. In one embodiment, a threaded connection is provided between the rotor 36 and the lateral portion 34-2 of the pulley 34. As shown in FIG. 1, the rotor 36 is generally disc or annularly shaped, and is positioned to encircle the shaft portion 32-1 of the journal bracket 32, extending generally radially outward. The rotor 36 can include a number of concentric annular ribs on both its front and rear sides near an outer diameter portion in a conventional arrangement. One or more fluid openings or passages can be formed through the rotor 36 in order to permit shear fluid to pass between front and rear sides of the rotor 36. Suitable radially extending channels or grooves can be formed in front or rear faces of the rotor 36 to provide space for the valve assembly 40.

In the illustrated embodiment, the reservoir 48 is directly attached to the rotor 36, and torque input to the clutch 30 rotates the reservoir 48 with the rotor 36. The reservoir 48 can hold a supply of a shear fluid (e.g., silicone oil) for use by the clutch 30. Because the rotor 36 is part of an input subassembly with the pulley 34, the rotor 36 always rotates whenever there is a rotational input to the pulley 34. Rotation of the rotor 36 in turn keeps the shear fluid in the reservoir 48 under pressure, allowing the shear fluid to be maintained at a relatively high level of kinetic energy to help facilitate quick engagement of the clutch 30. As will be explained further below, the ability to maintain a high level of kinetic energy in the fluid decreases the reaction time of the clutch.

The housing 38 in the illustrated embodiment includes a base 38-1 and a cover 38-2, and forms an output or torque delivery portion of the clutch 30. In the illustrated embodiment, the cover 38-2 provides the mounting for the output structure 54 (e.g., fan) to the clutch 30. Cooling fins can be provided on the exterior of the housing 38 to help dissipate heat to ambient air. In the illustrated embodiment, the housing 38 is rotatably supported on the shaft portion 32-1 of the journal bracket 32, and encircles the shaft portion 32-1. The second bearing set 46 can rotatably mount the cover 38-2 on the shaft portion 32-1 of the journal bracket 32, with the cover 38-2 in turn supporting the base 38-1 and the output structure 54. The base portion 38-1 and the cover portion 38-2 can be secured together with suitable fasteners.

The working chamber 50 (synonymously called a working area) is defined between the rotor 36 and the housing 38. The presence of the shear fluid in the working chamber 50 creates a fluid friction coupling between the rotor 36 and the housing 38 to engage the clutch 30 and transmit torque between input and output components. An instantaneous percentage of torque transmission can vary as a function of the amount of shear fluid in the working chamber 50. Generally, the shear fluid is delivered to the working chamber 50 from the reservoir 48 along one or both of first and second fluid paths (described further below), and is returned to the reservoir 48 from the working chamber 50 through the return path 64. One or more suitable pumping structures can be included at or along the working chamber 50 to dynamically pump the shear fluid out of the working chamber 50 through the return path 64.

The valve assembly 40 can be attached to and carried by the rotor 36. In one embodiment, the valve assembly 40 is configured as described in commonly-assigned Published PCT Application WO 2012/024497, entitled "Viscous Clutch Valve Assembly," which is hereby incorporated by reference in its entirety. The valve assembly 40 is used to selectively cover and uncover a first opening (or passage or outlet bore) 66 from the reservoir 48. In some embodiments, the opening 66 can be defined in an orifice plate 68 that forms a wall of the reservoir 48. The opening 66 is a port or valve bore that when uncovered (i.e., opened), allows the shear fluid to flow from the reservoir 48 to the working chamber 50 along the first fluid path (which can traverse passages, grooves, channels, etc. in the rotor 36). The valve assembly 40 can be biased to the open position, for instance using a spring bias force. The valve assembly 40 can include an armature 70 located close to the axis A of the clutch 30 and in close proximity to the electromagnetic coil 42. As explained further below, energizing the electromagnetic coil 42 can move the armature 70 such that the valve assembly 40 covers the first opening 66. It should be understood that nearly any known type of electromagnetically actuated valve assembly can be utilized in alternative embodiments.

The electromagnetic coil 42 can include a wound coil of high temperature insulated copper wire placed in a cup (e.g., a steel cup) used to direct the flux in the area of the armature 70 along a flux circuit. The coil 42 can be rotationally fixed relative to the shaft portion 32-1. In the illustrated embodiment, the coil 42 encircles and is supported by the shaft portion 32-1 of the journal bracket 32, and can be assembled directly on the shaft portion 32-1. Suitable wiring for the coil 42 can be internally routed through the journal bracket 32, such that no tethers or coil mounting bracket is required in an area in front of the clutch 30 and the output structure (e.g., fan) 54. The coil 42 need not be mounted on any bearings, because the shaft portion 32-1 is rotationally fixed. Moreover, in the illustrated embodiment, the coil 42 is positioned inside the housing 38 and in the reservoir 48, that is, axially aligned with the reservoir 48 and positioned radially inward of an outer diameter of the reservoir 48. When power is applied to the coil 42 during operation, the armature 70 is attracted toward the coil 42 due to the magnetic field that is produced.

Figure 2:
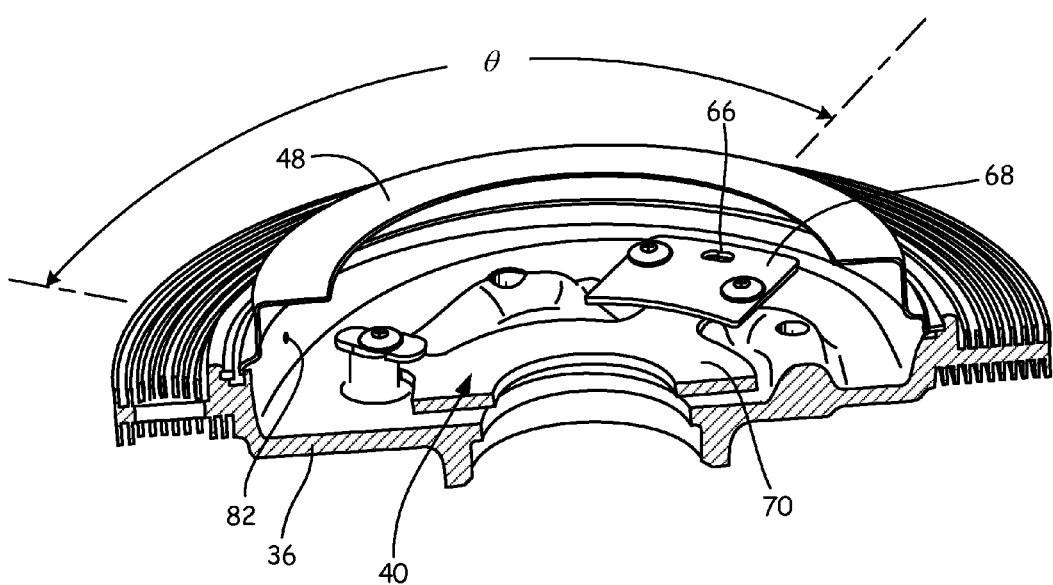
FIG. 2 is a cross-sectional perspective view of a portion of the clutch.
Figure 3:
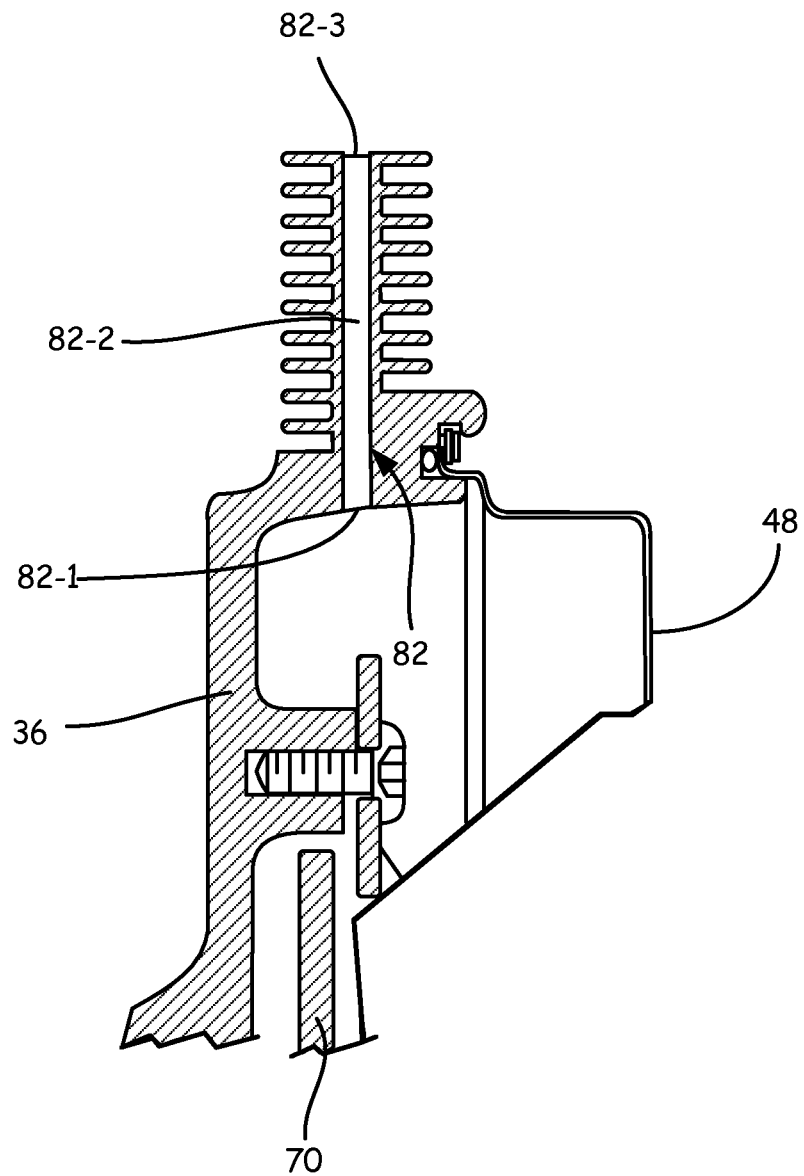
FIG. 3 is an enlarged cross-sectional view of a portion of the clutch.

FIG. 2 is a cross-sectional perspective view of a portion of the clutch 30, and FIG. 3 is an enlarged cross-sectional view of a portion of the clutch 30. FIGS. 2 and 3 are sectional views taken at a different angular position about the axis A than FIG. 1.

As shown in FIGS. 2 and 3, a second or additional opening (or passage or outlet bore) 82 from the reservoir 48 to the working chamber 50 is provided at a location spaced from the first opening 66, the orifice plate 68 and the valve assembly 40. The second opening 82 in the illustrated embodiment provides a bypass bore that is angularly spaced from the first opening 66 about the axis A (i.e., in a circumferential direction) by an angle θ, which is greater than zero. In one embodiment, the angle θ is approximately 90°. The second opening 82 is unobstructed, and can remain unobstructed regardless of the operational state of the valve assembly 40. There is no valve assembly that governs fluid flow through the second opening 82 in the illustrated embodiment. The second opening 82 defines an inlet 82-1 from the reservoir 48, a middle body portion 82-2 and an outlet 82-3 to the working chamber 50. In the illustrated embodiment, the inlet 82-1 of the second opening 82 is located radially outward of the valve assembly 40 at an outer diameter portion of the reservoir 48, and the outlet 82-3 is located at an outer diameter portion of both the rotor 36 and working chamber 50. The middle body portion 82-2, which connects the inlet 82-1 and the outlet 82-3, can be arranged substantially radially. In further embodiments, the second opening 82 can have the outlet 82-3 or additional outlets release the shear fluid into the working chamber 50 at different or multiple radial locations.

A diameter of the second opening 82 can be selected to provide metering of shear fluid flow at a desired rate, in order to provide higher or lower output speed when the valve assembly 40 is in the "off" position and blocking fluid flow through the first opening 66. Metering can be provided at any location along the second opening 82.

Because the reservoir 48 rotates with the rotor 36, and rotates whenever there is a torque input to the clutch 30, a relatively steady and consistent flow of shear fluid through the second opening 82 can be provided to the working chamber 50 due to the kinetic energy imparted to the shear fluid in the illustrated embodiment. Kinetic energy provided to the shear fluid in the rotating reservoir 48 can also help maintain relatively constant flow despite continual pumping of the shear fluid back to the reservoir 48 from the working chamber 50 through the return path 64. The substantially radial orientation of the second opening 82 can help provide relatively rapid delivery of the shear fluid from the reservoir 48 to the working chamber 50. Moreover, because the shear fluid is stored in only a single, common reservoir 48 in the illustrated embodiment, shear fluid is readily and equally available at both the first and second openings 66 and 82, without a need to divide the shear fluid between different reservoir chambers in a way that could potentially create imbalanced fluid levels or require additional components such as a manifold that undesirably increase complexity of the clutch.

In operation, the clutch 30 provides multi-speed operation. The clutch 30 can provide a viscous engagement between an input and an output at all times, with the output speed selectively controlled between a relatively low engagement mode and a full engagement mode. Such control can be provided through the provision of first and second fluid paths from the single, common reservoir 48 to the working chamber 50. The first fluid path through the first opening 66 can be selectively opened and closed using the valve assembly 40, while the second fluid path through the second opening 82 can remain open and unobstructed at all times, regardless of the operation of any valve assembly. Shear fluid can always pass through the second opening 82 to the working chamber 50. In this way the clutch 30 can operate at a lower output speed (at all times) instead of turning off completely. Basically, the viscous clutch 30 can act as a two speed device. In an automotive fan cooling application, the lower speed can used for most general cooling requirements and the fully engaged mode can be used for major cooling requirements. Yet the clutch 30 can remain a purely viscous device, without the need for any friction clutch components that would undesirably add weight. Moreover, a low-speed operational mode can be provided whenever torque input is provided the clutch 30, without dependency on initial actuation of the valve assembly 40 in order to reach the low-speed engagement mode.

Selective control of the electromagnetic coil 42 and, in turn, the valve assembly 40 can be governed by the controller 80, which can be dedicated circuitry for the clutch 30 or can alternatively be integrated with other circuitry. In one embodiment, the electromagnetic coil 42 can be energized in a coarse or binary on/off manner by the controller 80 such that the valve assembly 40 tends to remain in either a fully open position (the default position) or a fully closed position when the coil 42 is selectively energized. In another embodiment, the coil 42 can be energized using pulse width modulated (PWM) signals from an electronic engine controller (not shown). PWM signals allow a dynamically variable average volume of shear fluid to flow out of the reservoir 48 through the first opening 66 along the first fluid path. Depending on the pulse width (i.e., duration) and frequency of PWM signals, the valve assembly 40 can variably adjust the amount of shear fluid allowed to pass out of the reservoir 48 through the opening 66 to the working chamber 50 over time.

For some applications, it may be preferable to provide only binary on/off control. In general, users transitioning from on-off type clutches (e.g., single-speed friction clutches) to viscous clutches need a control loop algorithm that determines required output speed (e.g., cooling fan speed) and controls the fully speed-variable viscous clutch accordingly. The present invention allows a nominally fully speed-variable viscous clutch to be used with a simple, binary on/off control strategy. While such a binary-controlled lacks full speed control, it is sufficient for many users without the resources to develop the required control algorithm while still giving those users more functionality than a standard on-off clutch.

Discussion of Possible Embodiments

The following are non-exclusive descriptions of possible embodiments of the present invention.

A viscous clutch can include a rotor; a housing member; a working chamber located between the housing member and the rotor, wherein a viscous fluid present in the working chamber rotationally couples the rotor and the housing member; a reservoir to hold the viscous fluid, the reservoir configured to rotate with the rotor; a return bore in fluid communication between the working chamber and the reservoir, to allow the viscous fluid to return from the working chamber to the reservoir; a first passage from the reservoir to the working chamber; a second passage from the reservoir to the working chamber, wherein the second passage is spaced from the first passage, and wherein the second passage extends substantially radially through the rotor; and a valve, wherein the valve is configured to selectively regulate flow of the viscous fluid through the first passage, wherein the second passage is unobstructed such that the viscous fluid can pass from the reservoir to the working chamber regardless of the operational state of the valve.

The clutch of the preceding paragraph can optionally include, additionally and/or alternatively, any one or more of the following features, configurations and/or additional components:

the reservoir can be directly attached to the rotor;

an electromagnetic coil configured to selectively actuate the valve; and a controller, wherein the controller is configured to govern operation of the electromagnetic coil such that the valve is actuatable in a binary on/off manner;

the second passage defines an inlet from the reservoir and an outlet to the working chamber, the inlet located radially outward of the valve; and/or the second passage defines an inlet from the reservoir and an outlet to the working chamber, the inlet located at an outer diameter portion of the reservoir.

A method for operating a viscous clutch can include rotating a reservoir with a torque input to the viscous clutch; continuously delivering a viscous fluid from the reservoir to a working chamber through a bypass bore; actuating a valve to selectively deliver the viscous fluid from the reservoir to the working chamber through a valve bore; and returning the viscous fluid from the working chamber to the reservoir.

The method of the preceding paragraph can optionally include, additionally and/or alternatively, any one or more of the following steps, configurations and/or additional features:

the viscous fluid can be returned from the working chamber to the reservoir continuously;

the bypass bore can deliver the viscous fluid to the working chamber at a location spaced from the valve bore; and/or the bypass bore can introduce the viscous fluid to an outer diameter portion of the working chamber.

A viscous clutch can include a rotor configured to accept a torque input; a housing member; a working chamber located between the housing member and the rotor, wherein a viscous fluid present in the working chamber rotationally couples the rotor and the housing member to transmit torque; a reservoir to store at least a portion of the viscous fluid; a return bore in fluid communication between the working chamber and the reservoir, to allow the viscous fluid to return from the working chamber to the reservoir; a first passage from the reservoir to the working chamber; a second passage from the reservoir to the working chamber, the second passage defines an inlet from the reservoir and an outlet to the working chamber, the inlet located at an outer diameter portion of the reservoir, and the inlet of the second passage being spaced from the first passage; and a valve, wherein the valve is configured to selectively regulate flow of the viscous fluid through the first passage, wherein the second passage is unobstructed such that the viscous fluid can pass from the reservoir to the working chamber regardless of the operational state of the valve assembly.

The clutch of the preceding paragraph can optionally include, additionally and/or alternatively, any one or more of the following features, configurations and/or additional components:

the reservoir can be configured to rotate with the rotor;

the reservoir can be directly attached to the rotor;

an electromagnetic coil configured to selectively actuate the valve; and a controller, wherein the controller is configured to govern operation of the electromagnetic coil such that the valve is actuatable in a binary on/off manner;

the second passage defines an inlet from the reservoir and an outlet to the working chamber, the inlet located radially outward of the valve;

the second passage defines an inlet from the reservoir and an outlet to the working chamber, the inlet located at an outer diameter portion of the reservoir;

the outlet can be located at an outer diameter of the rotor; and/or the second passage can extend substantially radially through the rotor.

In view of the entire present disclosure, persons of ordinary skill in the art will appreciate that the present invention provides numerous advantages and benefits over the prior art.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

Although the present invention has been described with reference to preferred embodiments, workers skilled in the art will recognize that changes may be made in form and detail without departing from the spirit and scope of the invention. For instance, in further embodiments.

The invention claimed is:

1. A viscous clutch comprising:
   a rotor;
   a housing member;
   a working chamber located between the housing member and the rotor, wherein a viscous fluid present in the working chamber rotationally couples the rotor and the housing member;
   a reservoir to hold the viscous fluid, the reservoir configured to rotate with the rotor;
   a return bore in fluid communication between the working chamber and the reservoir, to allow the viscous fluid to return from the working chamber to the reservoir;
   a first passage from the reservoir to the working chamber;
   a second passage from the reservoir to the working chamber, wherein the second passage is spaced from the first passage, and wherein the second passage extends substantially radially through the rotor; and
   a valve, wherein the valve is configured to selectively regulate flow of the viscous fluid through the first passage,
   wherein the second passage is unobstructed such that the viscous fluid can pass from the reservoir to the working chamber regardless of an operational state of the valve.

2. The viscous clutch of claim 1, wherein the reservoir is directly attached to the rotor.

3. The viscous clutch of claim 1 and further comprising:
   an electromagnetic coil configured to selectively actuate the valve; and
   a controller, wherein the controller is configured to govern operation of the electromagnetic coil such that the valve is actuatable in a binary on/off manner.

4. The viscous clutch of claim 1, wherein the second passage defines an inlet from the reservoir and an outlet to the working chamber, the inlet located radially outward of the valve.

5. The viscous clutch of claim 1, wherein the second passage defines an inlet from the reservoir and an outlet to the working chamber, the inlet located at an outer diameter portion of the reservoir.

6. A method for operating a viscous clutch, the method comprising:
- rotating a reservoir with a torque input to the viscous clutch;
- continuously delivering a viscous fluid from the reservoir to a working chamber through a bypass bore;
- actuating a valve to selectively deliver the viscous fluid from the reservoir to the working chamber through a valve bore; and
- returning the viscous fluid from the working chamber to the reservoir.

7. The method of claim 6, wherein the viscous fluid is returned from the working chamber to the reservoir continuously.

8. The method of claim 6, wherein the bypass bore delivers the viscous fluid to the working chamber at a location spaced from the valve bore.

9. The method of claim 6, wherein the bypass bore introduces the viscous fluid to an outer diameter portion of the working chamber.

10. A viscous clutch comprising:
- a rotor configured to accept a torque input;
- a housing member;
- a working chamber located between the housing member and the rotor, wherein a viscous fluid present in the working chamber rotationally couples the rotor and the housing member to transmit torque;
- a reservoir to store at least a portion of the viscous fluid;
- a return bore in fluid communication between the working chamber and the reservoir, to allow the viscous fluid to return from the working chamber to the reservoir;
- a first passage from the reservoir to the working chamber;
- a second passage from the reservoir to the working chamber, wherein the second passage defines an inlet from the reservoir and an outlet to the working chamber, the inlet located at an outer diameter portion of the reservoir, and wherein the inlet of the second passage is spaced from the first passage; and
- a valve, wherein the valve is configured to selectively regulate flow of the viscous fluid through the first passage, wherein the second passage is unobstructed such that the viscous fluid can pass from the reservoir to the working chamber regardless of an operational state of the valve.

11. The viscous clutch of claim 10, wherein the reservoir is configured to rotate with the rotor.

12. The viscous clutch of claim 10, wherein the reservoir is directly attached to the rotor.

13. The viscous clutch of claim 10 and further comprising:
- an electromagnetic coil configured to selectively actuate the valve; and
- a controller, wherein the controller is configured to govern operation of the electromagnetic coil such that the valve is actuatable in a binary on/off manner.

14. The viscous clutch of claim 10, wherein the second passage defines an inlet from the reservoir and an outlet to the working chamber, the inlet located radially outward of the valve.

15. The viscous clutch of claim 10, wherein the outlet is located at an outer diameter of the rotor.

16. The viscous clutch of claim 10, wherein the second passage extends substantially radially through the rotor.

* * * * *